(12) United States Patent
Van Bussel et al.

(10) Patent No.: US 11,160,285 B2
(45) Date of Patent: Nov. 2, 2021

(54) CARRIER FOR HOLDING POULTRY CARCASSES

(71) Applicant: MAREL STORK POULTRY PROCESSING B.V., Boxmeer (NL)

(72) Inventors: Gerardus Johannes Catharina Van Bussel, Neerkant (NL); Heinze Annema, Gemert (NL); Maurice Eduardus Theodorus Van Esbroeck, Bemmel (NL)

(73) Assignee: MAREL POULTRY B.V., Boxmeer (NL)

( * ) Notice: Subject to any disclaimer, the term of this patent is extended or adjusted under 35 U.S.C. 154(b) by 82 days.

(21) Appl. No.: 16/639,906

(22) PCT Filed: Aug. 13, 2018

(86) PCT No.: PCT/NL2018/050541
§ 371 (c)(1),
(2) Date: Feb. 18, 2020

(87) PCT Pub. No.: WO2019/035712
PCT Pub. Date: Feb. 21, 2019

(65) Prior Publication Data
US 2021/0084914 A1 Mar. 25, 2021

(30) Foreign Application Priority Data

Aug. 18, 2017 (NL) ..................................... 2019428

(51) Int. Cl.
*A22C 21/00* (2006.01)
(52) U.S. Cl.
CPC ...... *A22C 21/0046* (2013.01); *A22C 21/0053* (2013.01)

(58) Field of Classification Search
CPC . A22C 21/00; A22C 21/0053; A22C 21/0007; A22C 21/0038; A22C 21/0046
(Continued)

(56) References Cited

U.S. PATENT DOCUMENTS

| 6,837,782 B2 | 1/2005 | Hetterscheid et al. |
| 2010/0323599 A1* | 12/2010 | Hiddink ............ A22C 21/0046 452/179 |
| 2014/0357172 A1* | 12/2014 | Peters ................ A22C 21/0046 452/149 |

FOREIGN PATENT DOCUMENTS

| EP | 1430780 A1 | 6/2004 |
| EP | 2162007 A1 | 3/2010 |

OTHER PUBLICATIONS

Netherlands Search Report and Written Opinion from Application No. NL2019428, dated Apr. 4, 2018.
(Continued)

*Primary Examiner* — Richard T Price, Jr.
(74) *Attorney, Agent, or Firm* — Workman Nydegger

(57) ABSTRACT

The present invention relates to a carrier for holding poultry carcasses, comprising a frame part, for attaching the carrier to a processing line; a hook part, fixed to the frame part; and a support part, rotatably connected to the frame part, wherein the support part is movably between an unloaded position, in which a poultry carcass can be loaded on the carrier, between the hook part and the support part; and a loaded position, in which the poultry carcass is being held by the carrier, between the hook part and the support part. The poultry carcass may for instance be a breast cap, including breast fillets and a breast bone. The invention also relates to a method of providing poultry carcasses on such carrier.

20 Claims, 5 Drawing Sheets

(58) Field of Classification Search
USPC ................ 452/177, 179, 180, 185, 187, 188
See application file for complete search history.

(56) References Cited

OTHER PUBLICATIONS

International Search Report and Written Opinion from Application No. PCT/NL2018/050541, dated Nov. 14, 2018.

* cited by examiner

CARRIER FOR HOLDING POULTRY CARCASSES

BACKGROUND

The present invention relates to a carrier for holding poultry carcasses during processing of the carcass.

In poultry processing lines poultry carcasses are typically processed and divided into carcass parts, such as breast fillets, legs and wings. This processing occurs in largely automated processing lines, typically at high speed, wherein different processing steps have dedicated processing stations to maintain a high level of accuracy and keep possible waste to a minimum. One of these processing steps is the removal of the breasts fillets from the breast cap of the carcass.

SUMMARY

It is a goal of the present invention to increase the accuracy of processing poultry carcasses, in particular the accuracy of the removal of breast fillets and/or inner fillets from the breast cap of poultry carcasses.

The present invention thereto provides a carrier for holding poultry carcasses, comprising a frame part, for attaching the carrier to a processing line; a hook part, fixed to the frame part; and a support part, movably, in particular rotatable or translatable, connected to the frame part, wherein the support part is movable between an unloaded position, in which a poultry carcass can be loaded on the carrier, between the hook part and the support part; and a loaded position, in which the poultry carcass is being held by the carrier, between the hook part and the support part. The poultry carcass may for instance be a breast cap, including breast fillets and a breast bone, and can relate to any part of the poultry which is processed. The carrier according to the invention is particularly suitable for use with breast caps. The term rotatable is also considered to include the term pivotable.

The hook part is fixed to the frame part, such that in use, there usually is no mutual movement between the frame part and the hook part. It is also possible to integrate the hook part into the frame part. The support part may be used to feed the poultry carcass to the hook part, and may be oriented in any position. The movement of the support part changes the mutual orientation or distance between the (stationary) hook part and frame part on the one hand, and the support part on the other, between an unloaded and a loaded position, or state.

The unloaded position is for instance an open position and the loaded position is for instance a closed position. The support part may for instance by default be in a loaded position, even if the carrier is empty and not provided with a carcass (yet). During loading of a carcass, the support part may be brought into the unloaded position to receive a carcass part, and then be brought into the loaded position (again), to hold the carcass within the carrier. It may also be that the support part naturally is in the unloaded state, or position, and during loading of the carcass, the support is brought in the loaded state, or position, and maintains this loaded state, or position. The loaded state, or position, may for instance be a state of the carrier in which a poultry carcass is held by the carrier, wherein the unloaded state, or position, is an empty state, wherein the carrier is free to accept a poultry carcass.

In the carrier, the hook part may have a first leg substantially perpendicular to the support part, and a second leg substantially parallel to the support part. The first leg may be for arranging the second leg at a distance from the support part, wherein between the second leg and the support part a receiving space is arranged for receiving at least a part of a poultry carcass, in particular at least a part of a breast cap of the poultry carcass.

A part of the poultry carcass which might be used to hold the carcass in the carrier is arranged on the inner side of the carcass, between the breast fillets of the carcass (but on the inside). At that location, at the transition with the location of the neck of the carcass, a bone piece is located which can advantageously be used to position the breast cap on the carrier. This bone piece is anatomically also indicated as the Processus episternalis, of the breast bone. It may be this part of the poultry carcass, or the breast cap, which is used to align the carcass on the carrier.

A poultry carcass may for instance be pushed, or slid, over the support part until the carcass reaches the hook part, where it is stopped. During this motion, the poultry carcass may force the support part to move, in particular translate or rotate, between its unloaded position to its loaded position, wherein, at the end when the carcass reached the hook part, the poultry carcass is held by the hook part and the support part.

The hook part may comprise aligning means, for aligning a poultry carcass in the carrier. These aligning means may for instance be chamfered edges or aligning surfaces, which force the poultry carcass on a predetermined position on the carrier. Although poultry carcasses, and breast caps in particular, may have generally the same shape and form, individual differences always remain. In automated processing lines, the accuracy of the positioning of the carcass on the carrier typically increase the yield, or the amount of meat harvested from the carcass, because all processing actions can be optimized for the desired orientation or positioning of the carcass. A different (and undesired) placement of the carcass on the carrier, for instance because of a slightly different shape of the breast cap, might result in a loss of breast fillets, or in the inclusion of bone in the fillets, which needs to be avoided.

The hook part may comprise two pins, between which pins a channel may be formed for receiving a part of a breast cap or poultry carcass, wherein, preferably, the channel tapers from the outer ends of the pins. When part of the breast cap is placed between the two pins, in the channel, the carcass, or breast cap, has a predetermined position on the carrier, which increases the overall accuracy and yield of the production line. Tapering of the channel may further increase the accuracy, since the position of the carcass is increasingly fixed the further the carcass (or the breast cap) enters the channel. This may automatically position the carcass or breast cap in the carrier, in a predetermined position. The channel may be formed for receiving the Processus episternalis, of the breast bone of the breast cap in particular.

The channel, and the preferable tapering thereof, may also be used to accommodate tissue parts around the breast cap of the carcass to pass. Such tissue parts are typically present between the breast bone and the breast meat of the carcass, and are fixed to the edge of the breast bone. When this tissue is aligned in the channel, this also results in a correct aligning of the breast cap, and thus the carcass, in the carrier.

The outer ends of each of the pins may be provided with an guiding edge, for guiding the breast cap of the poultry carcass into the channel. Such guiding edge may for instance be a rounded or chamfered edge, wherein the distance between the outer pins increases towards their outer ends. This guiding edge facilitates introduction of the carcass, and in particular the breast cap, into the channel between the pins, and forces the carcass or breast cap towards the middle of the channel.

The two outer ends of the pins may each comprise a chamfered surface, such that the two chamfered surfaces together form a substantially V-shaped section. The angle enclosed by the two surfaces may lie between 30 and 150 degrees, in particular between 60 and 120 degrees, more in particular between 75 and 100 degrees, for guiding the poultry carcass between the pins.

The side of the hook part facing towards the support part may be blunt and/or may be provided with rounded edges. The hook part which comes into contact with the carcass is thus not sharp. Sharp edges might get stuck into a bone or meat part of the carcass, which would prevent a correct alignment or placement of the poultry carcass on the carrier.

The side of the hook part directed towards the support part may be provided with an aligning edge, for instance a rounded edge, for aligning the poultry carcass on the support part. This rounded edge may be the part of the hook part which is directed towards the part of the support part where the poultry carcass is loaded into the carrier. The aligning edge may for instance be used to guide, or force, the poultry carcass on the support part such that it causes the support part to move, or rotate, from its unloaded to its loaded position.

The distance between the hook part and the support part, in loaded position, may be adjustable. This distance, in the loaded position, may determine the clamping force or holding force the carrier exerts on the poultry carcass. For smaller birds, one might reduce this size, whereas for larger birds, this distance might be increased. An adjustable size thus increases the flexibility and versatility of the carrier in a production or processing line.

The support part may be configured to be rotatable compared to the frame part, over an angle between 0 and 25, in particular between 0 and 10 degrees. The rotation is preferably a relatively small rotation, such that limited movement of the support part is allowed, limiting material stress and prolonging lifespan of materials.

Between the support part and the frame part a biasing element, such as a spring, may be arranged, for forcing the support part towards the hook part or for keeping the carrier in the loaded position, wherein, preferably, the force exerted by the biasing element is adjustable. By using a biasing element, and in particular one of which the force exerted is adjustable, the holding or clamping force of the carrier, in loaded position, can be chosen. In the loaded position, the biasing element will exert a force on the support part, forcing the support part towards its loaded position, to keep a poultry carcass, and in particular a breast cap, in the carrier. By using such biasing element, different types and sizes of poultry can be loaded on the same carrier.

The carrier may also comprise locking means, for locking the support part in a processing position. When the support part is moved in a direction from its unloaded to its loaded position, a clamping or holding force is exerted on the poultry carcass to keep the carcass in or on the carrier. The locking means may be configured to move the support part in that same direction, beyond the loaded position, and lock the support part in that position. Typically, this additional movement is a limited movement, wherein the support part is moved between 0.2 and 1.2 mm, in particular between 0.3 and 1 mm. This additional movement results in an increased holding or clamping force, to make sure the poultry carcass is kept on or in the carrier during further processing of the carcass. The locking means keep the support part in the processing position. The locking means may also be used to keep the support part in the loaded position.

The support part may be provided with a protrusion, in particular a bulge, preferably arranged opposite the hook part. Poultry carcasses, and breast caps in particular, have recesses in them (anatomically). In particular towards the location of the neck of the poultry, on the inside of a breast cap such recess is present. By providing a protrusion, or bulge, which is at least partially form fitting to this recess, the breast cap may further be aligned on the support part of the carrier. The protrusion or bulge may further be used for holding the carcass between the hook part and the (protrusion of the) support part. By using a bulge, the holding or clamping forces, keeping the carcass in the carrier, can be distributed evenly over the poultry carcass.

At a transition between the support part and the bulge, a part of the bulge may be arched, preferably arched with a radius between 20 and 50 mm, in particular between 30 and 40 mm, to facilitate loading of the poultry carcass. When sliding the poultry carcass over the support part, at a certain location the bulge is encountered, which provides an obstacle for sliding the poultry carcass further. An arched part of the bulge allows for a relative smooth transition between support part and bulge. The radius between 20 and 50 mm allows for a particular smooth transition and an easy sliding of the poultry carcass onto the carrier.

The support part may have an outer surface which is shaped at least partly complementary to the inner surface, or the interior side, of the poultry carcass to be loaded in the carrier. When forces are exerted on the carcass, these forces can be distributed over the poultry carcass, to prevent peak forces and damaging of the poultry carcass.

The support part may have a first end, for receiving the poultry carcasses, and a second end, for holding the poultry carcasses, wherein, preferably, the first end is rounded to facilitate receipt of the carcass. The support part may for instance be elongated. The protrusion of the support part may be arranged at the second end and/or in the loaded position, the poultry carcass may be held between the hook part and the second end of the support part.

When the support part is rotatably connected to the frame, the axis of rotation of the support part may for instance be located between the first and second end, and in particular is located on the half of the support part closest to the first end. By having the axis of rotation closes to the first end compared to the second end, a relative small rotation results in a relative large movement on the second end (due to a longer arm).

The support part may be substantially smooth, such that poultry carcasses can slide over the support part towards the hook part. By having smooth surfaces and sliding of carcasses over the support part, the processing of poultry carcasses, and breast caps in particular, can be automated with automated movers and sliders. A smooth support part, or at least a smooth outer part thereof, prevents that poultry carcasses get stuck onto the support part during processing or loading.

The frame part may be made of metal, and the support part may be made of a food grade plastic. The hook part may also be made of metal, or be integrally formed with the frame part. Most contact between the poultry carcass and the carrier will be with the support part of the carrier, whereas the structural integrity is mostly dominated by the frame part and hook part.

The invention further relates to a method for providing poultry carcasses on a carrier according to the invention, comprising the steps of sliding a poultry carcass along a support part, wherein the poultry carcass causes the support part to move, in particular to translate or rotate; stopping the sliding of the poultry carcass with a hook part; and holding the poultry carcass between the hook part and the support part.

BRIEF DESCRIPTION OF THE DRAWINGS

The invention will be further elucidated herein below on the basis of the non-limitative exemplary embodiments shown in the following figures. Herein.

DETAILED DESCRIPTION OF VARIOUS EMBODIMENTS

Figure 1:
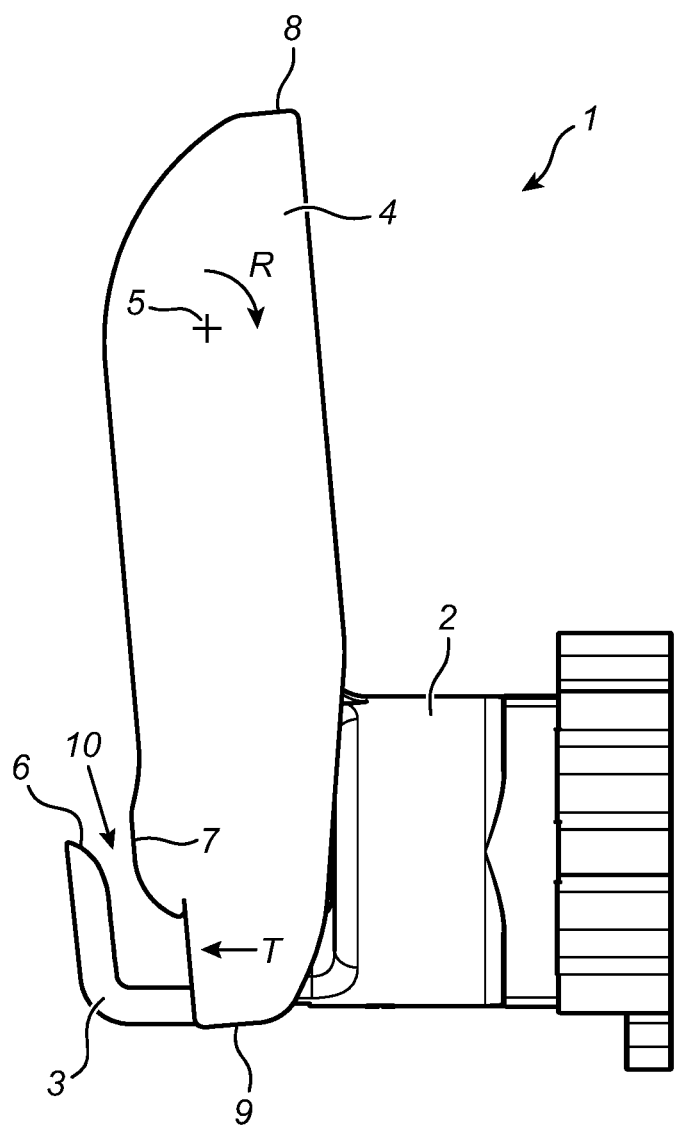
FIG. 1 schematically shows a side view of a carrier according to the invention, in an unloaded position.
Figure 2:
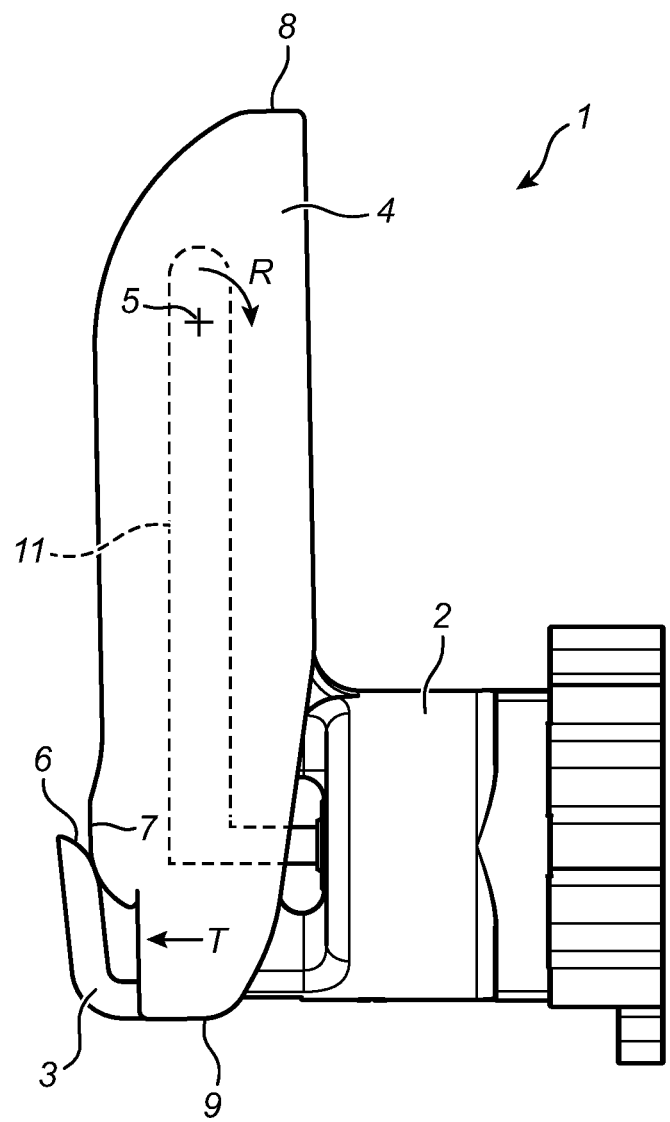
FIG. 2 schematically shows a side view of a carrier according to the invention, in an loaded position.

FIG. 1 schematically shows a side view of a carrier (1) according to the invention, in an unloaded position. The carrier (1) comprises a frame part (2), for attaching the carrier (1) to a processing line, a hook part (3), fixed to the frame part (2) and a support part (4), rotatably connected to the frame part (2). The support part is rotatable about an axis of rotation (5) between an unloaded position, as shown in FIG. 1, and a loaded position, as shown in FIG. 2. In the unloaded position, as shown in FIG. 1, a poultry carcass (not shown) can be loaded on the carrier (1), between the hook part (3) and the support part (4).

The hook part (3) is blunt, and has a rounded edge (6). This side, or edge (6) of the hook part (3) directed towards the support part (4) acts as an aligning edge (6), for aligning the poultry carcass (not shown) on the support part (4). In the shown orientation for instance, the curved or round edge directs a carcass towards the support part (4), when a carcass would be moved downwards.

The support part (4) is provided with a protrusion (7), in the form of a bulge (7), arranged on the support part (4) at a location facing the hook part (6). The support part (4) has a first end (8), for receiving the poultry carcasses, and a second en (9), for holding the poultry carcasses, wherein the first end (8) is rounded to facilitate receipt of the carcass, and wherein the protrusion (7) is arranged at the second end (9). The protrusion (7) and the hook part (3) together hold the poultry carcass in a loaded position. In the shown unloaded position, an opening (10) is present between the protrusion (7) and the hook part (3), for insertion of a poultry carcass (not shown). If no protrusion (7) is present on the support part (4), it is the support part (4) itself fulfilling that function.

When moving towards the loaded position, the support part (4) will rotate in rotation direction (R), which will result in a relative translational movement (T) at the second end (9) of the support part (4), thus moving the protrusion (7) towards the hook part (3). If no protrusion (7) is present on the support part (4), it is the support part (4) itself fulfilling that function.

FIG. 2 schematically shows a side view of a carrier (1) according to the invention, in a loaded position. Corresponding features compared to FIG. 1 have been given the same numbers. In FIG. 2, the opening between the hook part (3) and the protrusion (7) is reduced, such that a holding or clamping force can be exerted on a poultry carcass (not shown) present between the two. In FIG. 2 also a dotted line (11) is shown, to show how the frame part (2) may extend towards the axis of rotation (5) of the support part (4). Compared to the position shown in FIG. 1, the support part (4) has rotated in rotation direction (R), which results in a relative translational movement (T) at the second end (9) of the support part (4), thus moving the protrusion (7) towards the hook part (3). If no protrusion (7) is present on the support part (4), it is the support part (4) itself fulfilling that function.

Figure 3:
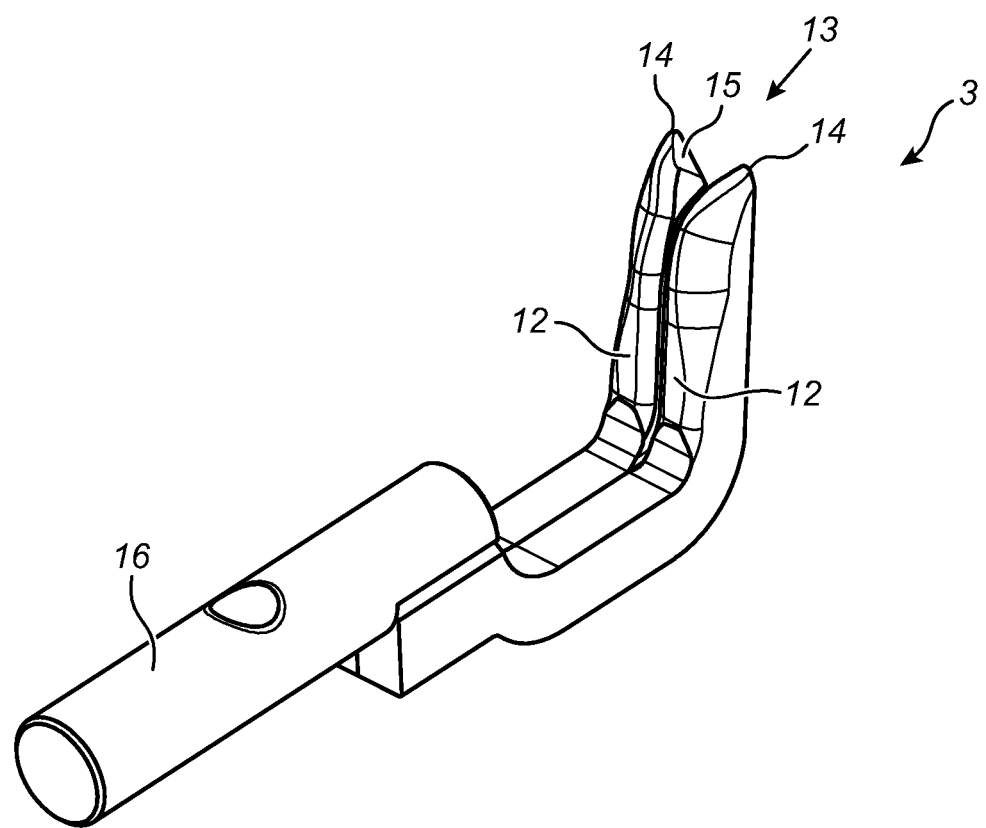
FIG. 3 shows a perspective view on a hook part according to the invention.

FIG. 3 shows a detailed view of a hook part (3) as used in FIGS. 1 and 2. The hook part (3) comprises two pins (12), between which pins a channel (13) is formed for receiving a part of a breast cap of the poultry carcass (not shown). The outer ends (14) of each of the pins (12) is provided with an guiding edge (15), for guiding the breast cap of the poultry carcass into the channel (13). The other end (16) of the hook part (3) may be used to couple or connect the hook part (3) with the frame (2) of the carrier (1).

Figure 4:
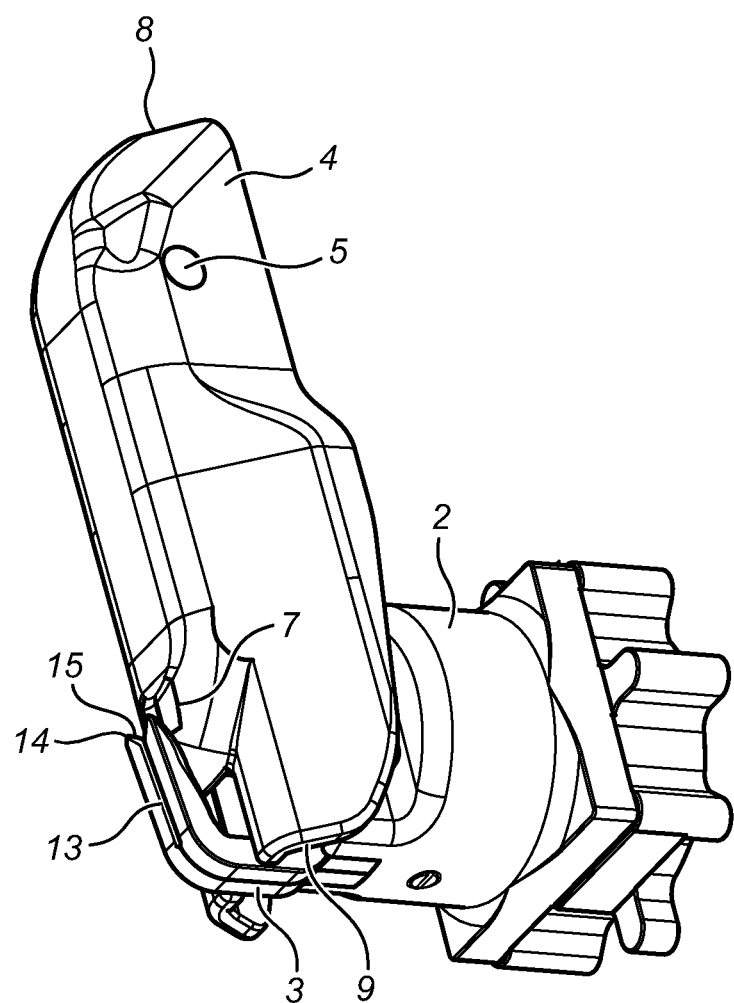
FIG. 4 shows a perspective view on a carrier according to the invention, in a loaded position.

FIG. 4 shows a perspective view on a carrier according to the invention, in a loaded position. Corresponding features compared to the previous figures have been given the same numbers.

Figure 5:
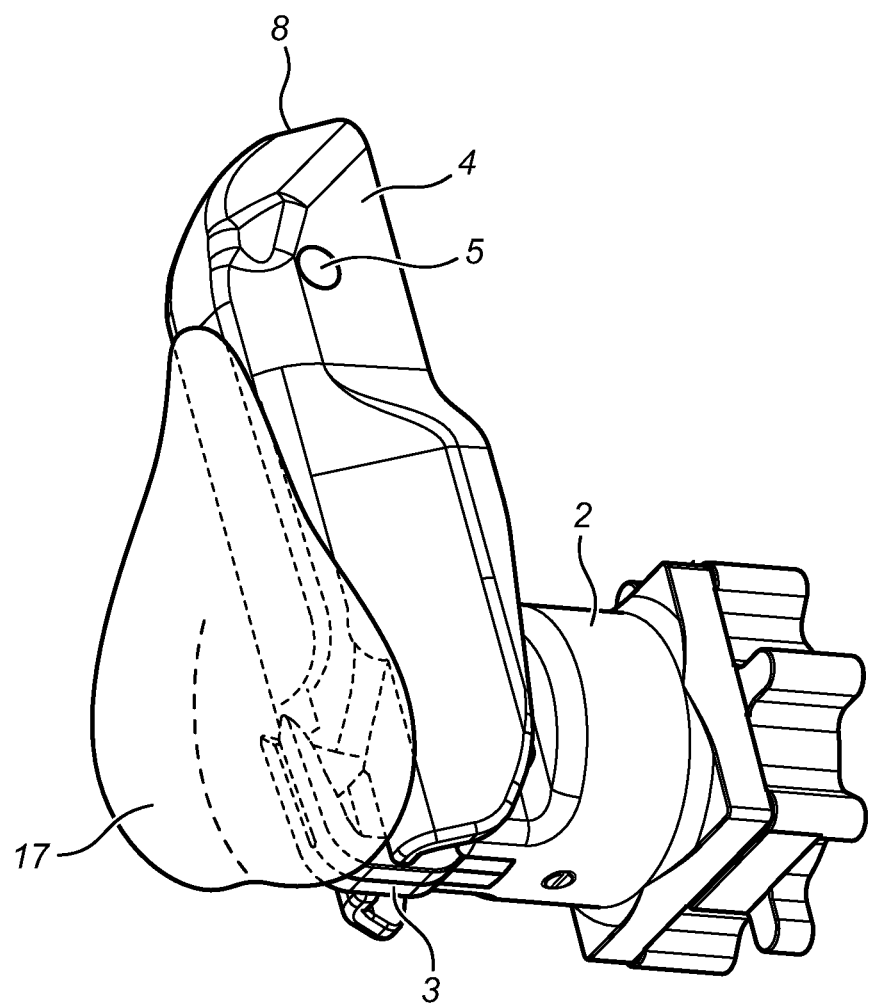
FIG. 5 shows the carrier according to FIG. 4, with a loaded breast cap.

FIG. 5 shows the carrier according to FIG. 4, with a loaded breast cap (17). Corresponding features compared to the previous figures have been given the same numbers.

The invention claimed is:

1. A carrier for holding a poultry carcass among a plurality of poultry carcasses processed along a processing line, the carrier comprising:
    a frame part arranged for attaching the carrier to a processing line;
    a hook part fixed to the frame part; and
    a support part movably connected to the frame part;
    wherein the support part is movable between an unloaded position, in which a poultry carcass can be loaded on the carrier, between the hook part and the support part; and a loaded position, in which the poultry carcass is held by the carrier, between the hook part and the support part.

2. The carrier according to claim 1, wherein the hook part forms at least one aligning surface arranged to align a poultry carcass in the carrier.

3. The carrier according to claim 1, wherein the hook part comprises first and second pins, a channel is formed between the first and second pins for receiving a part of the poultry carcass.

4. The carrier according to claim 3, wherein outer ends of each of the first and second pins define a guiding edge arranged to guide part of the poultry carcass into the channel.

5. The carrier according to claim 1, wherein a side of the hook part facing towards the support part has a blunt shape or is provided with rounded edges.

6. The carrier according to claim 1, wherein a side of the hook part directed towards the support part is provided with an aligning edge for aligning the poultry carcass on the support part.

7. The carrier according to claim 6, wherein the aligning edge defines a rounded edge.

8. The carrier according to claim 1, wherein a distance defined between the hook part and the support part, in loaded position, is adjustable.

9. The carrier according to claim 1, wherein the support part is configured to be rotatable compared to the frame part, over an angle between 0 and 25.

10. The carrier according to claim 1, wherein between the support part and the frame part, a biasing element is arranged, for forcing the support part towards the hook part or for keeping the carrier in the loaded position, wherein, the force exerted by the biasing element is adjustable.

11. The carrier according to claim 10, wherein the biasing element is a spring.

12. The carrier according to claim 1, comprising locking means for locking the support part in a processing position or in the loaded position.

13. The carrier according to claim 1, wherein the support part is provided with a protrusion arranged for facing the hook part.

14. The carrier according to claim 13, wherein the protrusion is a bulge, and wherein at a transition between the support part and the bulge, a part of the bulge is arched, with a radius between 20 and 50 mm arranged to facilitate loading of the poultry carcass.

15. The carrier according to claim 1, wherein the support part has a first end, for receiving the poultry carcasses, and a second end, for holding the poultry carcasses, wherein the first end is rounded to facilitate receipt of the carcass.

16. The carrier according to claim 15, wherein a protrusion is arranged at the second end of the support part and wherein, in the loaded position, the poultry carcass is arranged to be held between the hook part and the second end of the support part.

17. The carrier according to claim 1, wherein the support part is rotatably connected to the frame part.

18. The carrier according to claim 1, wherein the support part is provided with a protrusion arranged on the support part at a location facing the hook part, the support part having a first end arranged for receiving the poultry carcass, and a second end arranged for holding the poultry carcass, wherein the first end is rounded to facilitate receipt of the poultry carcass, and wherein the protrusion is arranged at the second end, the protrusion and the hook part are arranged hold the poultry carcass in the loaded position;

wherein in the unloaded position, an opening is defined between the protrusion and the hook part for insertion of a poultry carcass;

wherein when moving towards the loaded position, the support part is arranged to rotate in a rotation direction, in which a relative translational movement at the second end of the support part occurs, such that the protrusion is moved towards the hook part.

19. A carrier for holding a poultry carcass among a plurality of poultry carcasses processed along a processing line, the carrier comprising:

a frame part arranged for attaching the carrier to the processing line;

a support part rotatably movably connected to the frame part for the poultry carcass to slide therealong;

a hook part fixed to the frame part and arranged to stop the poultry carcass;

wherein the support part is movable between an unloaded position, in which a poultry carcass can be loaded on the carrier, between the hook part and the support part; and a loaded position, in which the poultry carcass is held by the carrier, between the hook part and the support part.

20. The carrier according to claim 19, wherein the support part is provided with a protrusion arranged on the support part at a location facing the hook part, the support part having a first end arranged for receiving the poultry carcasses, and a second end arranged for holding the poultry carcasses, wherein the first end is rounded to facilitate receipt of the carcass, and wherein the protrusion is arranged at the second end, the protrusion and the hook part are arranged hold the poultry carcass in the loaded position;

wherein in the unloaded position, an opening is defined between the protrusion and the hook part for insertion of a poultry carcass;

wherein when moving towards the loaded position, the support part is arranged to rotate in a rotation direction, in which a relative translational movement at the second end of the support part occurs, such that the protrusion is moved towards the hook part.

* * * * *